United States Patent

[11] 3,545,398

[72] Inventors William E. Fisher;
John A. H. Morrison, Glendora, California
[21] Appl. No. 721,307
[22] Filed April 15, 1968
[45] Patented Dec. 8, 1970
[73] Assignee Aerojet-General Corporation
El Monte, California
a corporation of Ohio

[54] MANEUVER CONTROL SYSTEMS FOR CYCLOIDAL PROPELLERS
7 Claims, 6 Drawing Figs.
[52] U.S. Cl. ................................................. 114/144; 318/547
[51] Int. Cl. ............................................... B65h 25/00
[50] Field of Search ..................................... 114/144, 146; 74/471; 318/548, 547, 20.225(X), (Inquired); 170/147

[56] References Cited
UNITED STATES PATENTS
1,681,500 8/1928 Schneider .................... 170/147
1,946,693 2/1934 Hodgman ..................... 318/20.225
2,155,892 4/1939 Von Den Steinen ......... 115/52X
2,250,772 7/1941 Mueller et al ................ 115/52X
3,140,688 7/1964 Shotto ........................... 114/144
3,218,531 11/1965 Smith et al .................... 318/548X Primary Examiner—Andrew H. Farrell
Attorneys—Edward O. Ansell and D. Gordon Angus ABSTRACT: This disclosure relates to maneuver control systems for use with cycloidal propellers on marine vessels.

A control system according to the present disclosure includes control means located at each of a plurality of control stations. Control apparatus is associated with each control means to effectuate steerage and speed control of the propeller.

Optional and desirable features of the present disclosure include selector means for selecting one of the plurality of control stations to control the maneuvering of the vessel. Drive means may be associated with at least some of the control stations so that the control means at the noncontrolling stations follow the position of the control means at the controlling station. Preferably, the control means are lever arms which are capable of pivoting about each of two mutually perpendicular axes. Pivotal movement of the lever arm about one axis causes operation of speed control apparatus, while pivotal movement about the other axis causes operation of steering control apparatus.

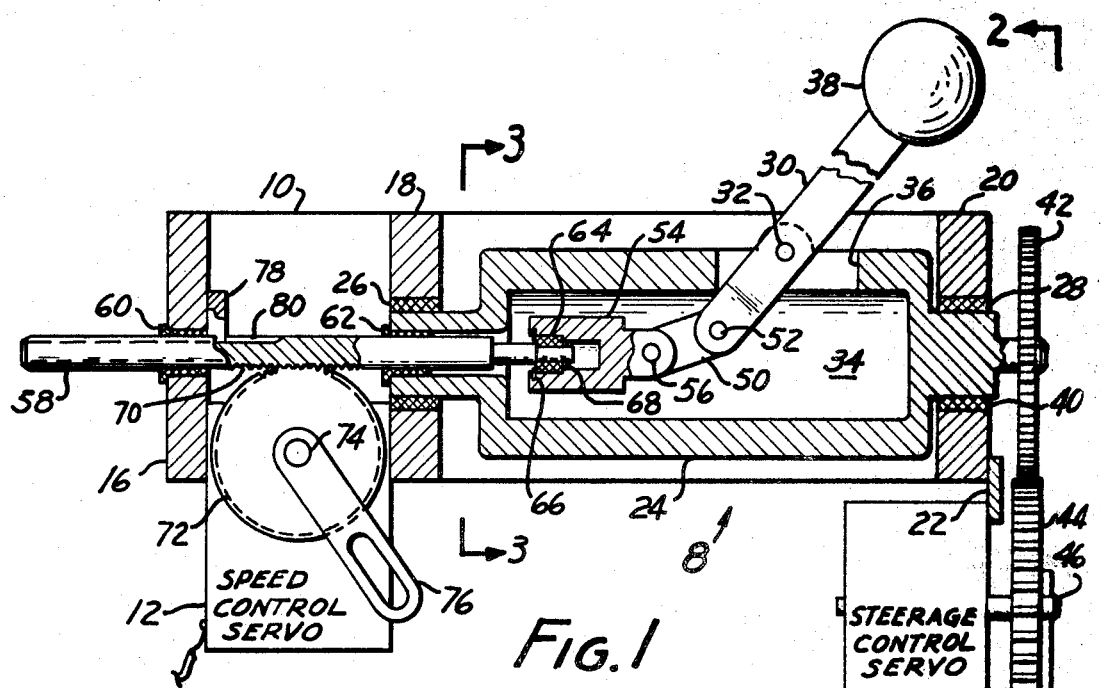
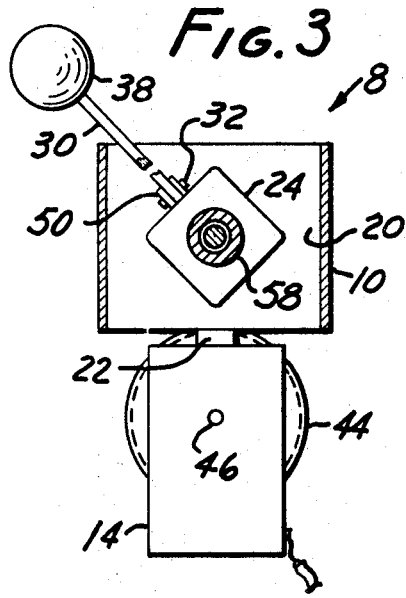
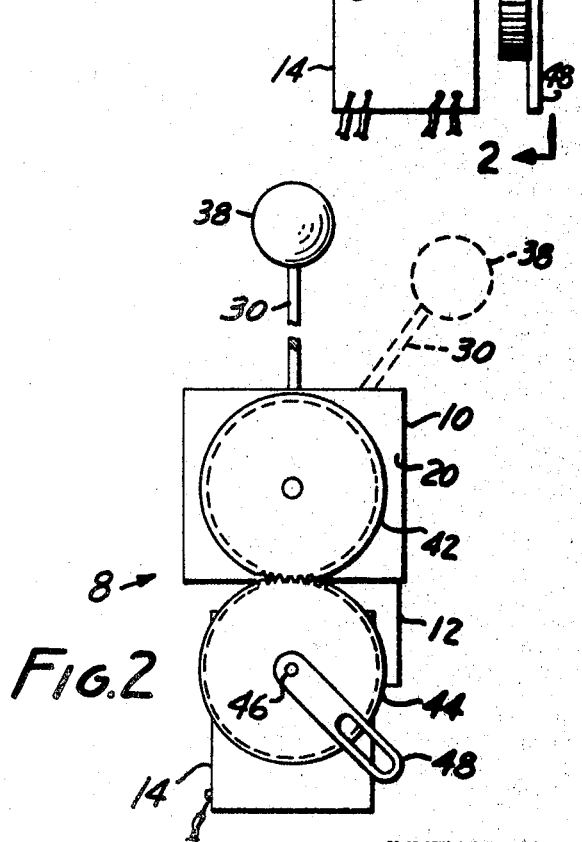

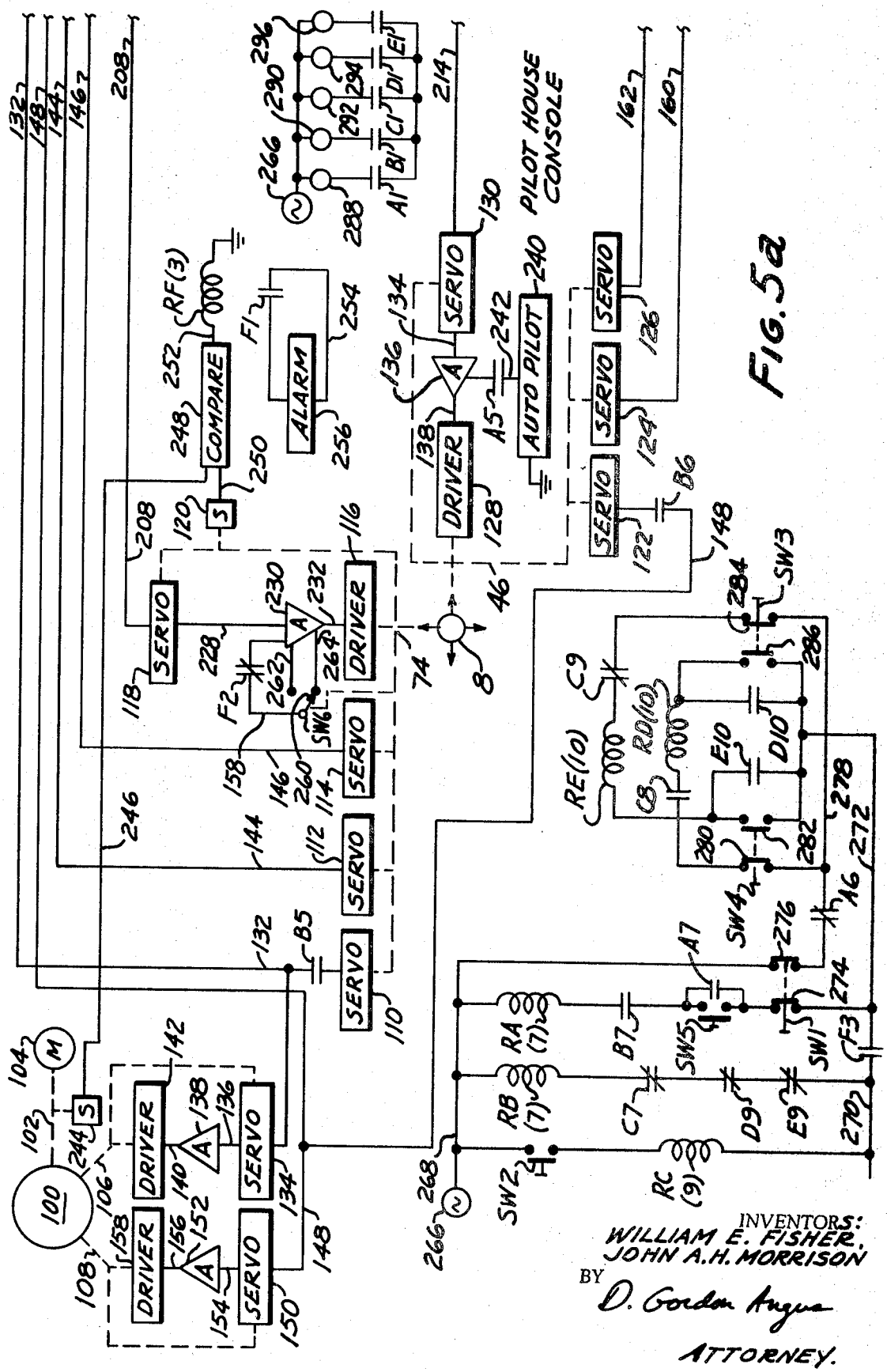

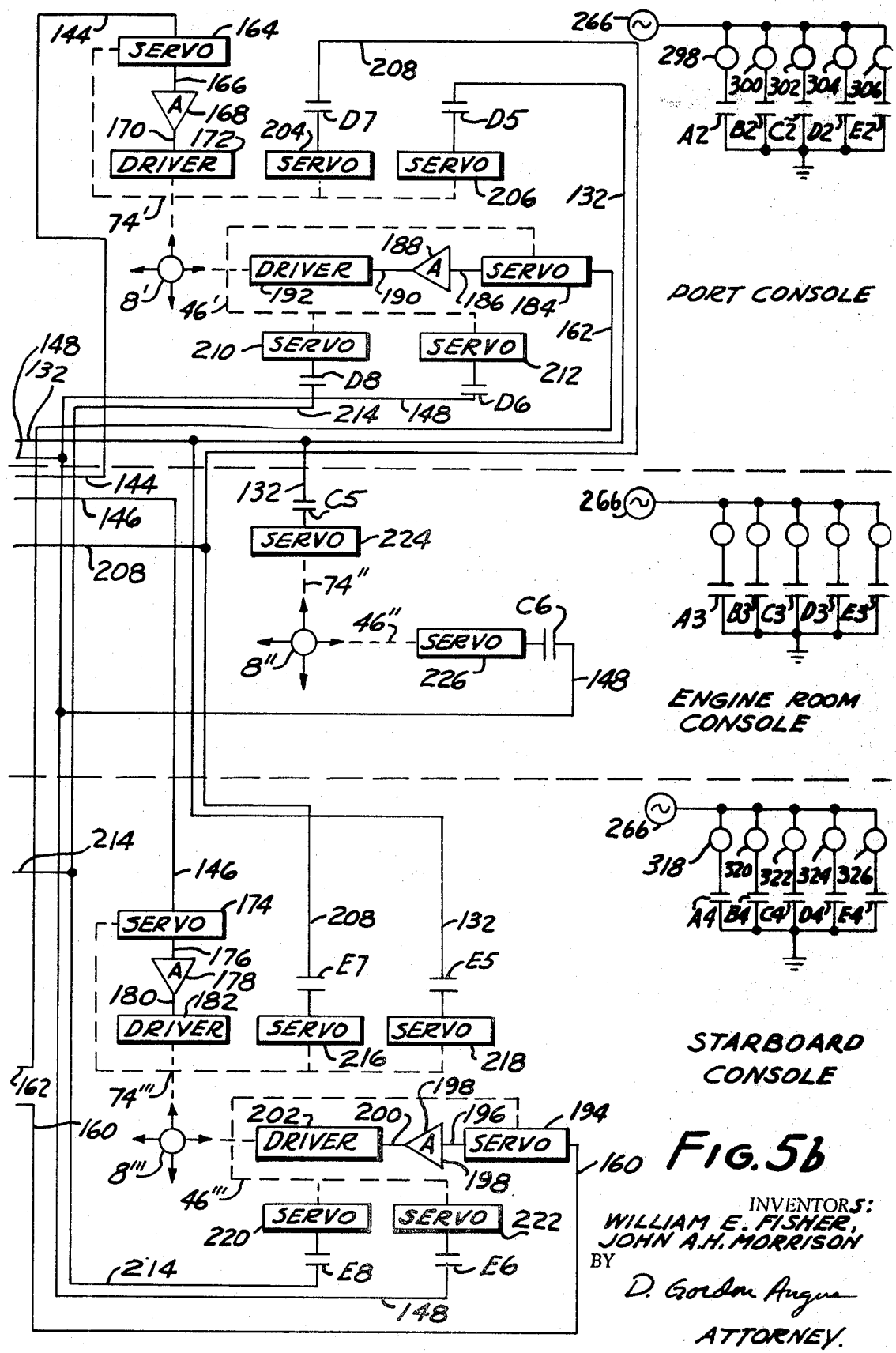

MANEUVER CONTROL SYSTEMS FOR CYCLOIDAL PROPELLERS

This invention relates to maneuver control systems, and particularly to maneuver control systems for controlling cycloidal propellers on marine vessels.

Heretofore, some marine vessels have been provided with rudders and screw propellers to steer and drive the vessel. Mechanical linkages between the engine room and the rudders and propellers have provided control over the position of the rudders and the speed of the propellers. Usually it is preferred the steerage and speed of the vessel be selected by personnel in a pilot house. When it was desired to maneuver the vessel by changing the speed or direction, or both, of the vessel, personnel in the pilot house would relate the desired change to personnel in the engine room who in turn would effectuate the maneuver by operating the mechanical linkage.

In other marine vessels, steerage and speed control have been effectuated by means of a cycloidal propeller. In its most basic form, a cycloidal propeller is a propeller which is capable or revolving about an axis to drive the vessel and which is capable of changing its thrust angle and pitch. By altering the pitch of the cycloidal propeller, the vessel may be propelled forward and altering the thrust angle steering is accomplished.

Heretofore, cycloidal propellers have been operated by personnel within the pilot house by means of mechanical linkages. Typically, a cycloidal propeller includes a first mechanical linkage capable of changing the thrust angle of the propeller to steer the vessel and a second mechanical linkage capable of adjusting the pitch for altering the speed of the vessel.

The mechanical linkages offer no opportunity to permit maneuvering control from other locations than the pilot house because it is not generally possible to effectuate control of the linkages from more than one location. Thus, even with cycloidal propellers, it has still been necessary for the pilot house personnel to inform the engine room personnel of the desired maneuvers for the vessel, and the maneuvers are actually performed by the engine room personnel.

It is an object of the present invention to provide a maneuver control system for a cycloidal propeller wherein the steering and speed control of the vessel may be controlled by any one of a plurality of remote stations.

Another object of the present invention is to provide an electrical control system for controlling cycloidal propellers on marine vessels.

Another object of the present invention is to provide a control system for controlling cycloidal propellers on marine vessels wherein the speed and steerage of the vessel may be controlled by a single means.

A maneuver control system for controlling a cycloidal propeller on a marine vessel according to the present invention includes a plurality of control stations. Means is provided at each control station for operating control apparatus which in turn controls the thrust angle and pitch functions of the cycloidal propeller.

According to an optional and desirable feature of the present invention, selector means is provided for selecting one of the plurality of control stations to control the steerage and speed of the vessel.

According to another optional and desirable feature of the present invention, drive means is associated with at least some of the control systems so that the control means at each non-controlling control station will follow the position of the control means at the controlling control station.

According to another optional and desirable feature of the present invention, a lever arm is provided capable of pivoting about each of two mutually perpendicular axes. Pivotal movement of the lever arm about one of the mutually exclusive perpendicular axes causes operation of control apparatus for controlling the thrust angle of the cycloidal propeller, and pivotal movement of the lever arm about the other of the two mutually exclusive perpendicular axes causes operation of control apparatus to control the pitch of the cycloidal propeller relative to the vessel.

The above and other features of the present invention will be more fully understood from the following detailed description and the accompanying drawings, in which:

FIG. 1 is a side view in cutaway cross section of the presently preferred embodiment of a control mechanism for use in the control system according to the present invention;

FIG. 2 is an end view elevation taken at line 2–2 in FIG. 1;

FIG. 3 is a section view taken at line 3–3 in FIG. 1;

FIG. 4 is a block diagram illustrating the assemblage of FIGS. 5a and 5b; and

FIGS. 5a and 5b, taken together, are a block diagram of a control system for controlling a cycloidal propeller on a marine vessel according to the presently preferred embodiment of the present invention.

FIGS. 1—3 illustrate the preferred form of a lever arm control mechanism 8, sometimes hereinafter referred to as a "joystick," for use in the control system according to the present invention. Joystick 8 comprises a housing 10 adapted to be fixedly mounted to a panel (not shown) in a control room of a ship. Speed control servo 12 and steerage control servo 14 are fixedly mounted to housing 14. As will be more fully understood hereinafter, each of servos 12 and 14 may include a plurality of servomechanisms and a drive mechanism. Speed control servo 12 is mounted to housing 10 between walls 16 and 18 thereof. Steerage control servo 14 is mounted to wall 20 of housing 10 by means of bracket 22. Housing 24 is mounted within housing 12 and is journaled to walls 18 and 20 by means of bearings 26 and 28 respectively.

Lever arm 30 is pivotally mounted to housing 24 by pin 32 and extends into cavity 34 through slot 36. Handle 38 is mounted to lever arm 30 at its furthermost end. One end of housing 24 is provided with a shaft 40 journaled to wall 20 by means of bearing 28. Gear 42 is connected to shaft 40 and is in engagement with gear 44. Gear 44 is o connected to shaft 46 which provides the mechanical linkage to the control servos and drive means within steerage control servo 14. Also mounted to shaft 46 is a balance lever arm 48 to provide dynamic balancing of shaft 46.

Linkage 50 is pivotally mounted to lever arm 30 by means of pin 52 and is pivotally mounted to housing 54 by means of pin 56. Rack gear 58 is journaled to wall 16 by means of bearing 60 and to housing 24 by means of bearing 62 and to housing 54 by means of bearing 56. Preferably, retainer rings 66 and 68 are provided on housing 54 and on rack gear 58 so as to fix the axial location of rack gear 58 to housing 54. Teeth 70 of rack gear 58 engage gear 72 which is mounted to shaft 74 of speed control servo 12. Shaft 74 provides the mechanical linkage to the servos and drive mechanism within speed control servo 12. Lever arm 76 is mounted to shaft 74 to provide dynamic balancing of shaft 74. Dog 78 is mounted to wall 16 of housing 10 and is adapted to extend into slot 80 on rack gear 58. Dog 78 and slot 80 prevent rotation of rack gear 58 about its axis.

In the operation of the joystick illustrated in FIGS. 1—3, lever arm 30 may be pivoted about pin 32 by moving handle 38 between a left and a right-hand position as illustrated in FIG. 1. Pivotal movement of lever arm 30 about pin 32 causes housing 54 to be moved between left and right positions within cavity 34, as illustrated in FIG. 1. Movement of housing 54 between the left and right positions causes rack gear 38 to move from left to right, thereby rotating gear 72 about its axis. Rotation of gear 72 rotates shaft 74 to move the mechanical linkage of the servos and drive mechanism within speed control servo 12. Dog 78 cooperates with slot 80 to prevent rotation of rack gear 58.

To control the mechanical linkage of steerage control servo 12, handle 38 is pivoted about the axis of housing 24 (see FIG. 3). Movement of handle 38 about the axis of housing 24 causes housing 54 to rotate on bearings 64 about rack gear 58. Rack gear 58 is prevented from rotation by means of dog 78 within slot 80. However, rotation of housing 54 causes rotation of linkage arm 30 to thereby rotate housing 24 within bearings 26 and 28 journaled to walls 18 and 20. Rotation of housing 24 causes gear 42 to rotate, thereby driving gear 44 to rotate shaft 46. Rotation of shaft 46 controls the mechanical linkage within steerage control servo 14.

FIGS. 5a and 5b, when mated as illustrated in FIG. 4, illustrate the presently preferred form of a control system according to the present invention. The control system preferably includes a pilot house console (FIG. 5a), a port wing console, an engine room console and a starboard wind console (FIG. 5b), each for controlling cycloidal propeller 100 (FIG. 5a).

Cycloidal propellers are well known in the art and are controllable both in thrust angle and in the pitch at which the propeller is directed. A suitable cycloidal propeller for use in the present invention is commercially produced by Voith-Schnieder Company of Heidemhiem, West Germany.

Cycloidal propeller 100 is connected by means of drive shaft 102 to motor 104. Suitable hydraulic servomotor actuators (not shown) within the cycloidal propeller are connected by means of mechanical couplings 106 and 108 to control the thrust angle of the propeller and the pitch angle of the propeller relative to the ship, respectively. The physical positioning of coupling 106 determines the speed at which the ship is driven, and the positioning of coupling 108 determines the thrust angle of the propeller to thereby control the direction in which the ship travels.

A joystick control mechanism such as illustrated in FIGS. 1—3 is located at each console for controlling both the thrust angle of the cycloidal propeller and the pitch. Referring particularly to the control mechanism illustrated in the pilot house console (FIG. 5a), joystick 8 is mechanically connected to shafts 46 and 74 as hereinbefore described. As illustrated in FIG. 5a, shaft 74 is connected to each of servomechanisms 110, 112, 114 and 118, to driver 116 and to sensor 120 for purposes to be hereinafter described. Shaft 46 is connected to servomechanisms 122, 124, 126 and 130, and to driver 128.

By way of example, servomechanisms 110, 112, 114 and 118 and driver 116 may be connected to shaft 74 by locating these elements within speed control servohousing 12 (FIG. 1) and mechanically attaching them to shaft 74 (FIG. 1). Likewise, servomechanisms 122, 124, 126 and 130 and driver 128 may be connected to shaft 46 by physically locating them within steerage control servohousing 14 (FIG. 1) and mechanically coupling them to shaft 46 (FIG. 1).

Servomechanism 110 is connected through normally open relay contact B5 to conductor 132. Conductor 132 is connected to servomechanism 134 which in turn is connected via conductor 136 to amplifier 138. Amplifier 138 is connected via conductor 140 to driver 142 to control the positioning of speed control shaft 106 of cycloidal propeller 100. Conductor 132 also is connected to each of the remote consoles illustrated in FIG. 5b. The output of servomechanism 112 is connected via conductor 144 to the port wing console. The output of servomechanism 114 is connected via conductor 146 to the starboard wing console illustrated in FIG. 5b.

The output of servomechanism 122 is connected through normally open relay contacts B6 to conductor 148. Conductor 148 is connected to the input of servomechanism 150 which drives amplifier 152 by means of conductor 154. The output of amplifier 154 is connected via conductor 156 to driver 158. Driver 158 operates to control the positioning of steerage control linkage 108, to thereby control the direction of movement of the ship. Conductor 148 is also connected to each of the remote consoles illustrated in FIG. 5b. The output of servomechanism 124 is connected via conductor 160 to the starboard wing console illustrated in FIG. 5b and the output of servomechanism 126 is connected via conductor 162 to the port wing console.

Lead 144 is connected to servomechamisn 164 in the port console (FIG. 5b) which in turn is connected via conductor 166 to amplifier 168. Amplifier 168 is connected via conductor 170 to driver 172 which controls the positioning of coupling 74' of joystick 8'. Conductor 146 is connected to servomechanism 174 in the starboard wing console illustrated in FIG. 5b which in turn is connected via conductor 176 to amplifier 178. The output of amplifier 178 is connected through conductor 180 to driver 182 which controls the position of coupling 74''' of joystick 8'''.

Conductor 162 is connected to servomechanism 184 in the port wing console illustrated in FIG. 5b which in turn is connected via conductor 186, amplifier 188 and conductor 190 to driver 192 which in turn controls the position of coupling 46' of joystick 8' in the port wing console. Conductor 160 is connected to servomechanism 194 which in turn is connected via conductor 196 to amplifier 198. Amplifier 198 is connected via conductor 200 to driver 202 which in turn controls the the position of coupling 46''' of joystick 8''' in the starboard wing console illustrated in FIG. 5b.

Mechanical coupling 74' in the port wing console is also connected to servomechanisms 204 and 206. Servomechanism 204 is connected through normally open relay contacts D7 to conductor 208 which in turn is connected to the pilot house console illustrated in FIG. 5a. The output of servomechanism 206 is connected through normally open relay contacts D5 to conductor 132.

Mechanical coupling 46' in the port console is connected to servo mechanisms 210 and 212. Servomechanism 210 is connected through normally open relay contacts D8 to conductor 214 which in turn is connected to the pilot house console illustrated in FIG. 5a. The output of servomechanism 212 is connected through normally open relay contacts D6 to conductor 148.

Mechanical coupling 74''' of joystick 8''' in the starboard wing console illustrated in FIG. 5b controls the positioning of servomechanisms 216 and 218. Servomechanism 216 is connected through normally open relay contacts E7 to conductor 208 which in turn is connected to the pilot house console as hereinbefore described. Servomechanism 218 is connected through normally open relay contacts E5 to conductor 132. Mechanical coupling 46''' of joystick 8''' in the starboard wing console illustrated in FIG. 5b controls the position of servomechanisms 220 and 222. The output of servomechanism 220 is connected through normally open relay contacts E8 to conductor 214 which in turn is connected to the pilot house console as hereinbefore described. The output of servomechanism 222 is connected through normally open relay contacts E6 to conductor 148.

In the engine room console illustrated in FIG. 5b there is illustrated a joystick 8'' having a speed control linkage 74'' and a steering control linkage 46''. Speed control linkage 74'' controls the position of servomechanism 224 which is connected through normally open relay contacts C5 to conductor 132. The output of servomechanism 226 is connected through normally open relay contacts C6 to conductor 148.

In the pilot house console, conductor 208 is connected to the input of servomechanism 118. The output of servomechanism 118 is connected via conductor 228 to amplifier 230. The output of amplifier 230 is connected through conductor 232 to operate driver 116 which in turn operates the position of linkage 74 of joystick 8. Conductor 214 is connected to servomechanism 130 which in turn is connected via conductor 134 to amplifier 136. The output of amplifier 136 is connected through conductor 138 to driver 128 to control the positioning of linkage 46 of joystick 8.

An automatic pilot 240 is connected via conductor 242 and normally open relay contacts A5 to amplifier 136.

In the operation of the control system as thus far described, if relay contacts B5 and B6 are closed, movement of joystick 8 in the pilot house console will control cycloidal propeller 100. Movement of linkages 74 and 46 will cause operation of servomechanisms 110 and 122 to alter the voltages on conductors 132 and 148 to thereby operate servomechanisms 134 and 150, respectively. Operation of servomechanisms 134 and 150 will operate drivers 142 and 158, respectively, to thereby move linkages 106 and 108, respectively. When linkages 106 and 108 have moved to the positions desired, they will have adjusted servos 134 and 150 to again be balanced, and the speed and steerage of the cycloidal propeller 100 has been changed by the linkage as hereinbefore described.

When joystick 8 is moved, the linkages also cause operation of servomechanisms 112, 114, 124 and 126. Operation of servomechanisms 112 and 114 alters the voltages on conductors 144 and 146 to thereby effectuate operation of servomechanisms 164 and 174 in the port and starboard wing consoles, respectively. Operation of servomechanisms 164 and 174 causes operation of drivers 172 and 182, respectively, thereby moving linkages 74' and 74''', respectively, until they assume a position so as to rebalance servomechanisms 164 and 174. Likewise, operation of servomechanisms 124 and 126 by the pilot house joystick 8 causes servomechanisms 184 and 194 to operate, thereby operating drivers 192 and 194, respectively. Operation of these drivers causes movement of linkages 46' and 46''' of joysticks 8' and 8'''. It is therefore understood that if joystick 8 in the pilot house console is moved to a new position, the joysticks in the port and starboard wing consoles make a similar movement.

If the starboard wing console is controlling the cycloidal propeller, it can be seen that the pilot house joystick and port wing console joystick will follow the movement of the starboard wing console joystick. Thus, if starboard wing joystick 8''' is controlling propeller 100, relay contacts B5 and B6 are open and relay contacts E5, E6, E7 and E8 are closed. Thus, operation of joystick 8''' will cause servomechanisms 218 and 222 to control the speed and steerage of cycloidal propeller 100 as hereinbefore described, and operation of servomechanisms 216 and 220 will cause operation of servomechanisms 118 and 130 in the pilot house console to control the position of joystick 8 in the pilot house console. Movement of joystick 8 in the pilot house console induces signals in servomechanisms 112 and 126 to thereby drive drivers 172 and 192 in the port console to control the position of port wing console joystick 8'.

It can therefore be understood that movement of any one of the joysticks in the pilot house console, the port wing console or the starboard wing console causes a similar movement of the other two joysticks. This feature is desirable since it may be desirable to transfer the control of cycloidal propeller 100 from one console to another, and if the joystick to which control is transferred is already in the same position as the joystick from which control was relinquished, there will be no sudden operation or inadvertent loss of control of the cycloidal propeller drivers. Thus, sudden movement of the propeller may be avoided.

If it is desired that automatic pilot 240 control the steerage of the vessel, relay contacts A5 are closed, and relay contacts B5 and B6 are closed. The automatic pilot senses changes in the vessel's course by means of apparatus (not shown) which is well known in automatic pilots. The automatic pilot generates a signal which is representative of any corrections to be made to the course of the vessel which signal is amplified by amplifier 136 and drives driver 128. Driver 128 operates joystick 8 to effectuate steerage control in the manner hereinbefore described.

Sensor 244 is mechanically coupled to shaft 102 of motor 104 to impress a voltage on conductor 246 having a value dependent upon the relative speed of rotation of shaft 102. By way of example, sensor 244 may be a potentiometer mechanically coupled to shaft 102. The output of sensor 244 is connected via conductor 246 to a first input of comparator 248. A second input of comparator 248 is connected to sensor 120 by means of conductor 250. The output of comparator 248 is connected via conductor 252 to relay coil RF.

Relay RF controls three sets of relay contacts, namely, normally closed relay contact F2 and normally open relay contacts F1 and F3. Relay contacts F1 are connected via conductor 254 to alarm means 256. A suitable source of electrical energy (not shown) is included within the circuit of alarm 256 to energize suitable indicating means (not shown) when contacts F1 are closed. Indicating means associated with alarm means 256 is preferably located at each console. Relay contacts F2 are connected Via conductor 158 between amplifier 230 and movable contact 260 of switch SW6. Switch SW6 is connected to linkage 74 and is operable to selectively connect conductor 158 to either of two stationary contacts 262 and 264. Contacts 262 and 264 are connected to amplifier 230.

The purpose of sensors 120, 244 and comparator 248 is to normally energize relay coil RF to thereby open relay contacts F2 and to close relay contacts F1 and F3. The output of sensor 244 is dependent upon the torque of motor shaft 102 in driving cycloidal propeller 100. The output of sensor 120 is dependent upon the mechanical positioning of coupler 74 of joystick 8. Comparator 248 operates to compare the voltages produced by sensors 120 and 244 to normally energize relay coil RF. If the torque of shaft 104 exceeds a desired level as selected by the mechanical position of coupler 74, the voltage level output of comparator 248 decreases and relay RF deenergizes, thereby causing relay contacts F1 to energize alarm 256. At the same time, relay contacts F2 close to operate amplifier 230 through switch SW6 to thereby cause driver 116 to reposition coupler 74. The repositioning of coupler 74 drives speed driver 142 of the cycloidal propeller until the speed of the cycloidal propeller again is sufficient to permit comparator 248 to reenergize relay coil RF. Switch SW6 is controlled by linkage 74 in such a manner that movable contact 260 mates with one stationary contact when joystick 8 is positioned for forward drive of the propeller, and contact 260 mates with the other stationary contact when the joystick is positioned for reverse drive of the propeller.

The relay control system for operating the relay contacts and the motor control system is illustrated in FIG. 5a. A suitable source of electrical energy 266 is connected to conductors 268 and 270. Source 266 may, for example, be a source of alternating current having a frequency of 60 hertzs per second and a voltage of 24 volts. Connected in parallel relation between conductors 268 and 270 is a first series circuit comprising switch SW2 and relay coil RC and a second series circuit comprising relay coil RB and normally closed relay contacts C7, D9 and E9. Relay coil RB controls seven relay contacts designated herein as relay contacts B1—B7, and relay coil RC controls nine relay contacts designated herein as relay contacts C1—C9. Normally open relay contact F3, controlled by relay coil RF as hereinbefore described, is connected between conductor 270 and conductor 272. A series circuit comprising relay coil RA, normally open relay contacts B7, switch SW5 and contacts 274 of switch SW1 are connected in series between conductors 268 and 272. Normally open relay contact A7 is connected across switch SW5. Relay coil RA controls seven sets of relay contacts designated herein as relay contacts A1—A7.

Conductor 268 is connected through contacts 276 of switch SW1 and through normally closed relay contacts A6 to conductor 278. Contacts 274 and 276 of switch SW1 are mechanically coupled so that both contacts are either open or closed. Switch SW4 comprises contacts 280 and 282. Switch SW3 comprises contacts 284 and 286. Contacts 280 and 282 of switch SW4 are so arranged that when one contact is open, the other is closed. Likewise, contacts 284 and 286 of switch SW3 are so arranged that when one contact is open the other is closed.

Conductor 278 is connected through a first series circuit to conductor 272 through contacts 280 of switch SW4, normally closed relay contacts C8, relay coil RD and contacts 286 of switch SW3. Relay coil RD controls 10 relay contacts designated herein as relay contacts D1—D10. Normally open relay contacts D10 are connected across contacts 286 of switch SW3. A second series circuit is formed between conductors 278 and 272 by means of contacts 284 of switch SW3, normally closed relay contacts C9, relay coil RE, and contacts 282 of switch SW4. Relay coil RE controls 10 relay contacts designated herein as relay contacts E1—E10. Normally open relay contacts E10 are connected across contacts 282 of switch SW4. Each of switches SW2—SW5 are momentary switches having their normal positions as illustrated in the drawings. Switch SW1 is a dual position switch capable of remaining in either position.

In the operation of the relay control system illustrated in FIG. 5a, and assuming it is desired to operate cycloidal propeller 100 by means of joystick 8 in the pilot house console, switches SW1—SW5 are normally positioned as illustrated. In this case, relay coil RC is deenergized due to the open switch SW2, relay coil RA is deenergized due to the open condition of switch SW5, relay coil RD is deenergized due to the open condition of contacts 286 of switch SW3, and relay coil RE is deenergized due to the open position of contacts 282 of switch SW4. Thus, relay contacts C7, D9 and E9 are closed, thereby energizing relay RB. Each of the relay contacts B1—B7 is thereby switched to the opposite position from that illustrated in the drawings. Particularly, relay contacts B5 and B6 are closed. Thus, with relay RB energized, control of cycloidal propeller 100 is determined by the positioning of joystick 8 in the pilot house console as hereinbefore described.

If it is desired to operate cycloidal propeller 100 by means of automatic pilot 240, switch SW5 may be momentarily closed thereby energizing relay RA in addition to the energization of relay RB. Energization of relay RA operates each of relay contacts A1—A7 to the position opposite from that illustrated in the drawings, and relay contacts A5 close to deliver a signal from automatic pilot 240 to amplifier 136. Driver 128 is operated by the amplifier at a rate dependent upon the automatic pilot, and joystick 8 is thereby moved. Closure of relay contact A7 shunts switch SW5 so that subsequent opening of switch SW5 will not deenergize relay RA. Relay contacts B5 and B6 remain closed due to the energization of relay coil RB so that respective steerage and speed control signals may be delivered to the steerage and speed drivers for the cycloidal propeller by means of conductors 132 and 148 as hereinbefore described.

It it is desired to control the cycloidal propeller of either the starboard wing console or port wing console illustrated in FIG. 5b, switch SW5 is maintained in an open position as illustrated in FIG. 5a and switches SW1 and SW2 are maintained in the position illustrated in FIG. 5a so that a source of potential is across conductors 272 and 278, through closed contacts 276 on switch SW1 and normally open relay contact A6. It is assumed that relay RF is energized thereby closing relay contacts F3. if it is desired that joystick 8' in the port wing console control the operation of the cycloidal propeller, switch SW3 is momentarily operated thereby closing switch contacts 282 and opening contacts 284. Relay RD is energized through contacts 280 of switch SW4 and normally closed relay contacts C8. Energizing of relay RD causes each of relay contacts D1—D10 to change to the opposite position from that illustrated in the drawings, thereby closing relay contacts D5—D8. Thus, the cycloidal propeller is controlled by joystick 8' in the port wing console, and the positioning of joystick 8' also causes joysticks 8 and 8''' in the pilot house console and starboard wing console, respectively, to follow the positioning of joystick 8' in the port wing console as hereinbefore described.

Energization of relay RD also causes closing of relay contacts D10 so that when switch SW3 is released back to the position illustrated in FIG. 5a, relay RD remains energized through relay contact D10 so as to maintain control at the port wing console. The energization of relay RD causes relay contact D9 to open, thereby preventing operation of relay RB. The energization of relay RB opens relay contact B7 thereby preventing energization of relay RA.

Control of relay RE is substantially identical to the control of relay RD. Relay RE is controlled by switch SW4 in the same manner that relay RD is controlled by switch SW3. Energization of relay RE will give control of the cycloidal propeller to the starboard wing console illustrated in FIG. 5b, as hereinbefore described.

At any time, control may be taken by the engine room console by closing switch SW2. Closing of switch SW2 causes energization of relay RC. thereby changing the position of each of contacts C1—C9. With relay contacts C5 and C6 closed, joystick 8'' in the engine room console controls cycloidal propeller 100 as hereinbefore described. Furthermore, energization of relay RC opens relay contacts C7 thereby deenergizing relay RB and opening relay contacts C8 and C9 to thereby prevent energization of relays RD and RE, respectively. Preferably, switches SW1 and SW5 are located in the pilot house, switch SW3 is located in the port wing console, switch SW4 is located in the starboard wing console, and switch SW2 is located in the engine room.

It can be understood from the above that the cycloidal propeller may be controlled by any of five separate controllers, namely, from the pilot house, the port wing console, the starboard wing console, the engine room and by automatic pilot 240. It is noteworthy that the relay control circuit illustrated in FIG. 5a creates a priority between the various control consoles. Each of the pilot house, port and starboard wing controls is of equal priority and may take control from any other control except the engine room control, by merely momentarily depressing the respective switch. However, none of these aforementioned controls may take control from the engine room. By way of example, if the port wing console has energization of the maneuvering of the vessel due to energization of relay RD, the personnel at the starboard wing console may obtain control by merely depressing switch SW4 to break the circuit to relay RD by opening contacts 280 and to energize relay RE. Likewise, either the port or starboard wing consoles may obtain control from the pilot house console in a similar manner. Energization of either relay RD or RE opens the circuit to relay RB thereby taking control from the pilot house console.

If the automatic pilot has control due to the energization of relay RA, the pilot house personnel may obtain control by operating switch SW1 to open contacts 274 to deenergize relay RA.

Another noteworthy point with regard to the relay circuit illustrated in FIG. 5a is that the engine room console may take control of the steerage and speed controls at any time merely by closing switch SW2. Thus, although the pilot house console has priority over the automatic pilot and the port and starboard wing consoles, the engine room console has priority over all other stations. By operating switch SW2 to the position opposite from that illustrated in the drawings, relay RC is energized thereby operating relay contacts C1—C9 to the position opposite from that illustrated in the drawings. Operation of relay contacts C7 to an open position deenergizes relay RB which in turn prevents energization of relay RA by opening relay contacts B7. Furthermore, energization of relay RC causes relay contacts C8 and C9 to open, thereby preventing energization of relays RD and RE, respectively. Thus, the engine room console may take control of the cycloidal propeller at any time it desired without any affirmative action at any of the other consoles.

It is preferred that all of the relay coils be located physically within the engine room and that the conductors between the various switches to the relays be extended from each of the consoles to the engine room. In the event of flooding in the pilot house, the engine room may take control of the ship on independent circuitry. For this reason, servomechanisms 224 and 226 in the engine room console are not connected with the drivers in the pilot house, port and starboard wing consoles. In the event that any or all of the pilot house, port or starboard wing consoles are flooded, thereby rendering the circuitry associated with the control of their associated joysticks inoperative, the engine room may take control of the ship and continue to steer and control the driving of the ship by means of joystick 8'' in the engine room console.

Another noteworthy factor with regard to the circuitry illustrated in FIG. 5a is that if motor 104 delivers insufficient torque to cycloidal propeller 100, comparator 248 operated by sensors 120 and 244 deenergizes relay RF, thereby opening relay contacts F3. When relay contacts F3 open, steerage and speed control is taken from the port wing console, starboard wing console or automatic pilot, whichever the case may be, and delivers the control to the pilot house console depending upon the position of switch SW2. If cycloidal propeller 100 is ordinarily being controlled by the automatic pilot or the port or starboard wing console (so that switch SW2 is in the position illustrated in FIG. 5a), deenergization of relay RF opens relay contacts F3 to deenergize relays RA, RD or RE, as the case may be. Relay RB becomes energized and control of the ship is relinquished to the pilot house console.

A communication system may be associated with the control system so that personnel at each control system may determine which control console is controlling cycloidal propeller 100. At the pilot house console illustrated in FIG. 5a, a plurality of lamps 288, 290, 292, 294 and 296 is separately operable by normally open relay contacts A1, B1, C1, D1 and E1, respectively. Similarly, in the port wing console, lamps 298, 300, 302, 304 and 306 are separately operable by normally open relay contacts A2, B2, C2, D2 and E2, respectively. Lamps 308, 310, 312, 314 and 316 in the engine room console are separately operable by normally open relay contacts A3, B3, C3, D3 and E3, and lamps 318, 320, 322, 324 and 326 in the starboard wing console are separately operable by normally open relay contacts A4, B4, C4, D4 and E4, respectively.

If automatic pilot 240 is controlling cycloidal propeller 100, relays RA and RB are energized as hereinbefore described, and relay contacts A1—A4 and B1—B4 are energized thereby lighting lamps 288, 290, 298, 300, 308, 310, 318 and 320 in each of the consoles. Personnel at each console may determine from the operation of the lamps that the automatic pilot 240 is controlling cycloidal propeller 100 through the pilot house console joystick 8. Likewise, operation of lamps 292, 302, 312 and 322 will indicate to personnel that the engine room console is controlling the cycloidal propeller. Operation of lamps 294, 304, 314 and 324 will indicate to personnel that the port wing console is controlling cycloidal propeller 100, while operation of lamps 296, 306, 316 and 326 will indicate to personnel that the starboard wing console is controlling cycloidal propeller 100.

If desired, other suitable communication means may be utilized for indicating to personnel at the various consoles information regarding the positioning of the controlling joystick so that changeover and transfer of control of the cycloidal propeller from one console to another may be effectuated without disrupting the operation of the cycloidal propeller. By way of example, a suitable communications system may be utilized to indicate to the personnel at a particular console that it is desired that they take over control of cycloidal propeller 100 from a previously controlling console. Also, the communication system may indicate the position of the various joysticks so that personnel at all noncontrolling consoles may adjust their joysticks to a position compatible with the controlling joystick.

The present invention thus provides a maneuver control system for controlling a cycloidal propeller for a marine vessel. Although only one such control system has been illustrated, it is to be understood that if more than one cycloidal propeller is utilized on the vessel, identical control systems may be utilized for controlling each propeller. Thus, where there are both fore and aft cycloidal propellers, two-maneuvering control systems may be utilized for operating the two-cycloidal propellers independently of each other.

The control system according to the present invention provides an effective method and apparatus for controlling a cycloidal propeller on a marine vessel. The control system is easy to operate and provides mutual transfer of control from one console to another. The control system may be easily maintained and may be operated with a minimum of instruction.

This invention is not to be limited by the embodiments shown in the drawings or described in the description, which are given by way of example and not of limitation, but only in accordance with the scope of the appended claims.

We claim:

1. A vessel control system for a cycloidal propeller having alterable thrust angle and pitch for vessel speed variation and steering, respectively, comprising:

a plurality of stations including a central and a plurality of subordinates;

a controller in each of said stations including first and second means adapted to be moved in a pair of different directions corresponding to thrust angle and pitch variation, respectively, and first and second means respectively responsive to said movable means to generate corresponding signals;

drive means for the propeller, including thrust angle altering means and pitch altering means;

means for connecting said central station signal generator to operate said subordinate station movable means; and a selector for connecting the controller in a particular station to said drive means and for connecting said subordinate station signal generator to said central station movable means.

2. The control system of claim 1 and an automatic pilot in said central station; and in said selector means for connecting said automatic pilot to operate said central station movable means.

3. The control system of claim 2 and an alarm circuit responsive to the torque of the propeller; and in said selector means responsive to said alarm circuit for disconnecting the controller of any subordinate station or automatic pilot from said drive means and for connecting the controller of said central station to said drive means.

4. A control system according to claim 1 wherein each of said movable means includes a housing, a first body journaled to said housing for rotation about a first axis, a lever arm pivotally mounted to said first body, said first signal generator being connected to said first body, and a second body pivotally mounted to said lever arm for movement along said first axis, said second signal generator being journaled to said second body for deriving a second signal having a value representative of the position of said second body along said first axis; whereby rotation of said lever arm about said first axis causes rotation of said first body about said first axis, and rotation of said lever arm about a second axis, perpendicular to said first axis, causes movement of said second body along said first axis.

5. A control system according to claim 4 wherein the second signal generator is journaled to said first body.

6. A control system according to claim 5 wherein said second signal generator includes a rack gear journaled to said first and second bodies, a pinion gear engaged to said rack gear, and restraining means mounted to said housing to prevent rotation of said rack gear about said first axis.

7. A control system according to claim 6 wherein said rack gear is journaled to said housing to permit movement of said rack gear along said first axis.